United States Patent
Marathe et al.

(10) Patent No.: US 8,428,832 B2
(45) Date of Patent: Apr. 23, 2013

(54) METHOD AND APPARATUS FOR CALCULATING PAYLOAD WEIGHT

(75) Inventors: Sameer S. Marathe, Naperville, IL (US); John J. Baldauf, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 677 days.

(21) Appl. No.: 12/641,631

(22) Filed: Dec. 18, 2009

(65) Prior Publication Data
US 2010/0161184 A1 Jun. 24, 2010

Related U.S. Application Data

(60) Provisional application No. 61/140,355, filed on Dec. 23, 2008.

(51) Int. Cl.
*E01C 7/06* (2006.01)
(52) U.S. Cl.
USPC .......................................................... 701/50
(58) Field of Classification Search ............... 37/348, 37/466; 172/2–11; 177/136–139, 46, 47, 177/141; 701/1, 23, 25, 26, 27, 50; 702/173–175, 702/107
See application file for complete search history.

(56) References Cited

U.S. PATENT DOCUMENTS

| | | | |
|---|---|---|---|
| 3,580,343 A | 5/1971 | Hogue et al. | |
| 4,995,468 A | 2/1991 | Fukuda | |
| 5,067,572 A * | 11/1991 | Kyrtsos et al. | 177/139 |
| 5,509,293 A | 4/1996 | Karumanchi | |
| 5,824,965 A * | 10/1998 | Fujii et al. | 177/136 |
| 6,032,094 A * | 2/2000 | Yanagi et al. | 701/50 |
| 6,518,519 B1 | 2/2003 | Crane, III et al. | |
| 6,534,728 B1 | 3/2003 | Spikings | |
| 6,590,168 B2 | 7/2003 | Kawaguchi et al. | |
| 6,601,013 B2 | 7/2003 | Lueschow et al. | |
| 6,646,210 B1 | 11/2003 | Wissing | |
| 6,803,530 B2 | 10/2004 | Carlstrom et al. | |
| 7,247,803 B2 | 7/2007 | Takeda et al. | |
| 7,627,410 B2 * | 12/2009 | Berry et al. | 701/50 |
| 2006/0108154 A1 | 5/2006 | Mack et al. | |
| 2007/0181350 A1 | 8/2007 | Kranz et al. | |

* cited by examiner

*Primary Examiner* — Robert Pezzuto
(74) *Attorney, Agent, or Firm* — Leydig, Voit & Mayer (57) ABSTRACT

An apparatus for determining the weight of a payload in a bucket of a machine where the bucket is attached to a chassis of the machine by a linkage. The apparatus comprises an energy storage device for storing potential energy of the bucket, payload, and linkage when the bucket is moved from a first suspended position to a second suspended position. A mechanism provides physical data corresponding to a physical change in the energy storage device caused by storage of the potential energy and a processor calculates the weight of the payload using the physical data.

20 Claims, 5 Drawing Sheets

METHOD AND APPARATUS FOR CALCULATING PAYLOAD WEIGHT

CROSS-REFERENCE TO RELATED APPLICATIONS

This patent application claims the benefit of U.S. Provisional Patent Application No. 61/140,355, filed Dec. 23, 2008, which is incorporated by reference.

TECHNICAL FIELD

This patent disclosure relates generally to loaders and, more particularly, to methods and apparatuses for calculating the payload weight of a loader.

BACKGROUND

A loader is a construction machine typically used to transport a load of material, such as aggregate construction or mining material, from one place, such as a pile of stored material, to another, such as a truck used for hauling the material to another location. For example, a loader may be used to load a dump truck full of material or to transport material from a pile to a specific place where it is used, such as trench. Typically, loaders are wheeled or tracked vehicles having a large bucket on one end and include hydraulics or other mechanisms for raising and lowering the bucket and tilting the bucket. However, a loader can also be a stationary machine that is immobile, but used to move a load from one place to another, for example from a pile to the bed of a nearby dump truck. Generally, a loader is any device capable of using a bucket or other appropriate support structure to transport a payload from one place to another place.

Often, it is desirable to know the weight of a payload. For example, dump trucks used on the highway typically must abide by laws restricting the weight they can carry, and the restrictions are typically determined by a government highway authority. Depending on the density of the material loaded into a truck, it is possible to load more than the maximum allowed amount. In addition, loading too much weight into a truck can cause premature wear to the truck's suspension, drive train, and other parts affected by weight. In other instances, it may be desirable to know the weight of the payload. For example, when material is sold according to weight, knowing an amount of material loaded into a truck can provide a basis to calculate a cost of the loaded material.

To determine the weight of a payload, loaders often include bucket scales. A bucket scale is a system integrated into the loader which measures the weight of a payload. Typically, bucket scales measure hydraulic pressures associated with the bucket, such as pressures present in hydraulic cylinders used for lifting the bucket up and down, and for tilting the bucket about a pivot point.

Typical bucket scales require calibration before first use with a known weight by using the bucket scale to weigh the known weight and then adjusting settings of the bucket scale so that the weight registered equals the known weight. One option for calibrating a bucket scale includes use of prefabricated blocks, often cylindrical, of known weight for the purpose of calibration. Prefabricated blocks, however, are often prohibitively expensive and require maintenance. Moreover, the weight of the prefabricated blocks is unable to be distributed in the same manner as a payload of, for example, aggregate material. As a result, the use of prefabricated blocks can introduce errors into the calibration process.

Another option for calibration includes first weighing an empty loader, then weighing the same loader with a payload to determine the weight of the payload. Calibration, however, is typically performed on a job site, such as a construction or mining site, and owners of loaders often do not own the type of large scale needed to weigh loaders and, if they do, the scales generally are not located on job sites, but at other more permanent sites, such as an equipment storage facility owned by the owner of the loader.

When owners have scales on job sites, it is often for the purpose of weighing off-highway trucks. The scales used for weighing off-highway trucks are generally too small to be used for weighing the larger loaders often used for loading the off-highway trucks. Consequently, determining the weight of the payload involves weighing an empty off-highway truck, dumping a loader payload used for calibration into the off-highway truck, and weighing the off-highway truck again. Complicating matters is that larger loaders usually have buckets that are wider than the length of the beds of typical off-highway trucks. Therefore, the use of off-highway trucks with extra long beds, which are not always available, is necessary.

SUMMARY

The disclosure describes, in one aspect, a method of estimating the weight of a payload in a bucket of a machine where the bucket is attached by a linkage to a chassis of the machine. The method comprises orienting the bucket and linkage to a predetermined orientation in a first suspended position, storing potential energy of the bucket, payload, and linkage in an energy storage device by releasing the bucket and linkage from the first suspended position to a second suspended position. The work done on the energy storage device as the bucket and linkage move from the first suspended position to the second suspended position is measured, as is the geometrical change in a property of the bucket and linkage between an initial position and the second suspended position. The payload weight is calculated using the work done on the energy storage device and the difference in geometry of the bucket and linkage.

The disclosure describes, in another aspect, an apparatus for determining the weight of a payload in a bucket of a machine where the bucket is attached to a chassis of the machine by a linkage. The apparatus comprises an energy storage device for storing potential energy of the bucket, payload, and linkage, thereby causing the bucket to move from a first suspended position to a second suspended position. A mechanism provides physical data corresponding to a physical change in the energy storage device caused by storage of the potential energy, and a processor calculates the weight of the payload using the physical data.

The disclosure describes, in another aspect, an apparatus for calculating the weight of a payload used to calibrate a bucket scale of a machine having a bucket for carrying the payload, where the bucket is connected to a chassis of the machine by a linkage and the linkage is raised by a hydraulic lift cylinder assembly having a head-end. The apparatus comprises an energy storage device configured to be fluidly connected to the head-end of the lift cylinder assembly in order to store potential energy of the linkage as the linkage moves from a first position to a second position. A sensor provides physical data indicating work done on the energy storage device as the energy storage device stores potential energy of the linkage, and a processor receives the physical data and geometrical data corresponding to geometrical changes in the bucket and linkage caused by storage of the potential energy by the energy storage device and calculates the weight of the payload from the physical data and geometrical data.

DETAILED DESCRIPTION

Figure 1:
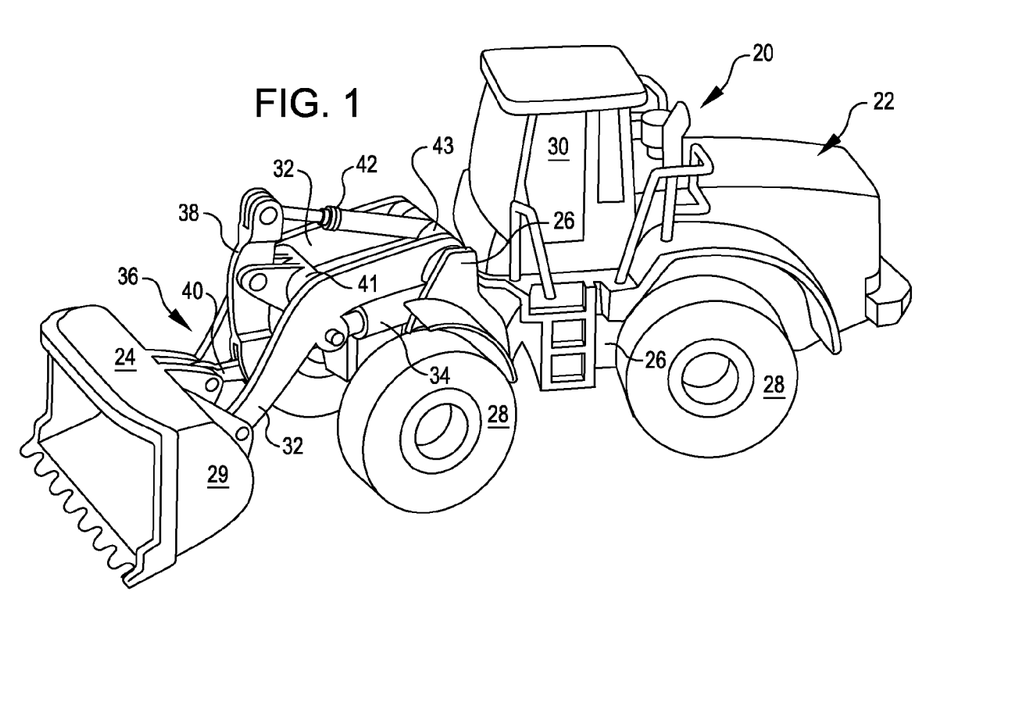
FIG. 1 is a side perspective view of a loader, in accordance with an embodiment.

Referring now to the drawings, in which like reference numerals represent like parts throughout the several views, FIG. 1 shows a loader 20 in accordance with an embodiment. The loader 20 includes a vehicle portion 22 connected to a bucket 24 on a front side of the vehicle portion 22. The vehicle portion 22, in an embodiment, includes a chassis 26 which is a frame for the vehicle portion 22, typically formed from steel or other metal. The chassis 26 supports various parts of the loader 20, either directly or indirectly, such as an engine, body panels, hydraulic system, and other parts. The chassis 26 itself is supported by a plurality of wheels 28 rotatably connected to the chassis 26. The vehicle portion 22 also includes a cab 30 attached to an upper middle section of the chassis 26. In an embodiment, the cab 30 is an enclosed structure having windows on lateral sides and in which an operator of the loader 20 sits and operates the loader 20.

The bucket 24 is an implement located at a front portion of the loader 20. In an embodiment, the bucket 24 is made from metal and comprises two parabolic or similarly-shaped plates 29 having a metal plate curved about the perimeter of each plate and extending horizontally between them so as to form a concave enclosure opening away from the loader 20. In general, the bucket may have any shape capable of holding a payload.

In an embodiment, the bucket 24 is attached to the vehicle portion 22 by a linkage comprising a pair of parallel booms 32 extending between a back portion of the bucket 24 to another location on the chassis 26, such as at a location immediately in front of the cab 30. Unless otherwise clear from context, the linkage connecting the bucket 24 to the vehicle portion 22 includes all components of the loader 20 that move in concert with the bucket 24 and booms 32 as the bucket 24 is raised and lowered. In an embodiment, each boom 32 is an elongate metallic structure pivotally attached to the chassis 26 at one end, and pivotally attached to a rear portion of the bucket 24 on an opposite end. For each boom 32, a hydraulic lift cylinder assembly 34 or other actuator for lifting the boom 32 is pivotally attached to the chassis 26 beneath the boom 32 at a location of the boom 32 between the bucket 24 and the location of the attachment of the boom 32 to the chassis 26.

In an embodiment, the lift cylinder assembly 34 is an actuator—such as a hydraulic cylinder including a rod enclosed by a casing, the rod able to extend out of or retract into the casing—able to increase and decrease its length, thereby causing its respective boom 32 to pivot upwardly about its respective attachment to the chassis 26, or retracting its length thereby causing the boom 32 to rotate downwardly about its attachment to the chassis 26. As the booms 32 rotate about their respective attachments to the chassis 26, the bucket 24 is raised and lowered accordingly. In general, any actuator or other mechanism capable of lifting the booms 32 may be used as an alternative to or in addition to the lift cylinder assemblies 34.

In an embodiment, the bucket 24 is additionally connected to the booms 32 by a tilt linkage 36, which determines the angular position of the bucket 24 relative to the booms 32. In an embodiment, the tilt linkage 36 includes a major tilt arm 38 and a minor tilt arm 40. The major tilt arm 38 is an elongate metallic structure rotatably connected at its middle portion to a first cross member 41 extending horizontally between corresponding middle portions of the booms 32. In an embodiment, a hydraulic tilt cylinder assembly 42 or other actuator for actuating the angular position of the bucket 24 relative to the booms 32 rotatably connects an upper end of the major tilt arm 38 to a second cross member 43 extending between the booms 32 near their connections to the chassis 26. Like the lift cylinder assembly 34, the tilt cylinder assembly 42 is an actuator able to increase and decrease its length, thereby rotating the major tilt arm 38 about its connection to the first cross member 41.

The end of the major tilt arm 38 opposite the tilt cylinder assembly 42 is connected to the bucket 24 by the minor tilt arm 40, which is an elongate piece of metal extending and rotatably connected to a rear portion of the bucket 24 above the connections of the bucket 24 to the booms 32. In an embodiment, the tilt cylinder assembly 42 can extend its length, thereby, through the tilt linkage 36, causing the bucket 24 to curl with a lower front edge of the bucket 24 rotating upwardly. Similarly, the tilt cylinder assembly 42 can retract its length, thereby, through the tilt linkage 36, causing the bucket 24 to tilt with the lower front edge of the bucket 24 rotating downwardly.

Figure 2:
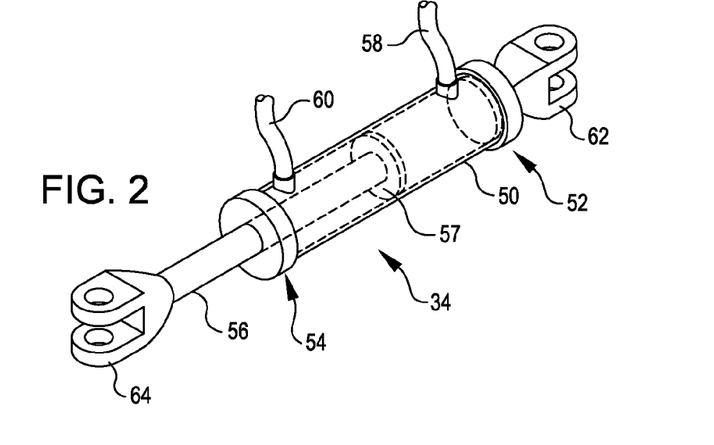
FIG. 2 is a side perspective view of a cylinder assembly of the loader of FIG. 1.

FIG. 2 shows a representation of a lift cylinder assembly 34. The lift cylinder assembly 34 includes a casing 50, which is a hollow, cylindrical section of rigid material such as metal capped on both ends. The lift cylinder assembly 34 includes a head-end 52 which is completely capped, and rod-end 54 through which an elongate metal rod 56 extends. A hydraulic head-end hose 58 is fluidly connected to the interior of the casing 50 at the head-end 52, while a hydraulic rod-end hose 60 is fluidly connected to the interior of the casing 50 at the rod-end 54. The rod 56 includes a plunger 57 inside the casing 50, the plunger 57 having a cross section approximately equal to the interior diameter of the casing 50 so as to fit in slidable but snug engagement against the interior of the casing 50. In this manner, a pressure differential across the head-end hose 58 and rod-end hose 60 causes the rod 56 to move relative to the casing 50. For instance, if there is higher pressure in the head-end hose 58 than in the rod-end hose 60, hydraulic fluid will force the plunger 57 towards the rod-end 54 of the lift cylinder assembly 34, thereby causing the rod 56 to exit the casing 50 about its length. Hydraulic fluid in the rod-end 54 of the lift cylinder assembly 34 exits the rod-end 54 through the rod-end hose 60 to a control valve (not shown) or other component of the hydraulic system 68 of the loader 20. Similarly, if the pressure in the rod-end hose 60 is higher than in the head-end hose 58, the plunger 57 is forced into the casing 50 away from the rod-end 54 towards the head-end 52 causing the rod 56 to retract into the casing 50.

In an embodiment, the tilt cylinder assembly 42 is functionally identical to the lift cylinder assembly 34, although it may have different dimensions, such as a different length or diameter. Consequently, reference numerals for the lift cylinder assembly 34 will be used to reference respective parts of the tilt cylinder assembly 42.

Physical data concerning the bucket 24 and the payload 44 are able to be gathered through sensors on the linkage connecting the bucket 24 to the chassis 26, such as through sensors associated with the lift cylinder assembly 34 and tilt cylinder assembly 42. For example, pressures inside of head-end 52 and rod-end 54 of each lift cylinder assembly 34 and tilt cylinder assembly 42 are able to be measured by taking measurements from a suitable pressure sensor. Likewise, the displacement of the rod 56 of each the lift cylinder assembly 34 and tilt cylinder assembly 42 can also be measured. In an embodiment, the plunger 57 includes a magnetic element that is sensed by a sensor (not shown) located on the casing 50. The sensor includes several sensing elements that react when the magnetic element is in close proximity, thereby indicating the location of the magnetic element relative to the casing 50 and, therefore, the displacement of the rod 56 relative to the casing 50. Generally, any mechanism or mechanisms for measuring the head-end 52 and rod-end 54 pressures, and rod 56 displacement can be used. In addition, by taking pressure and/or displacement measurements several times over a time period, additional data can be gathered and determinations made, such as the velocity of the rod 56 as it moves relative to the casing 50, the rates of change in the head-end 52 or rod-end 54 pressures, or other related physical data.

In addition, because the loader 20, as shown, includes two identical lift cylinder assemblies 34 that act in concert to raise and lower the booms 32, pressure and displacement measurements need only be taken from one of the lift cylinder assemblies 34 in order to provide data about the bucket 24. Nevertheless, pressure and/or displacement measurements can be taken for both lift cylinder assemblies 34 in order to increase the accuracy of the measurements taken. For instance, if the loader 20 is on an uneven surface, the head-end 52 pressures in each lift cylinder assembly 34 can be unequal and the pressures can be averaged or otherwise used together. In addition, taking measurements from more than one lift cylinder assembly 34 also can be used to provide redundancy so that sensors for one lift cylinder assembly 34 provide a reference against which to check the function of the sensors of the other lift cylinder assembly 34 and so that, should sensors in one lift cylinder assembly 34 fail, sensors in the other lift cylinder assembly 34 can be used.

Figure 3:
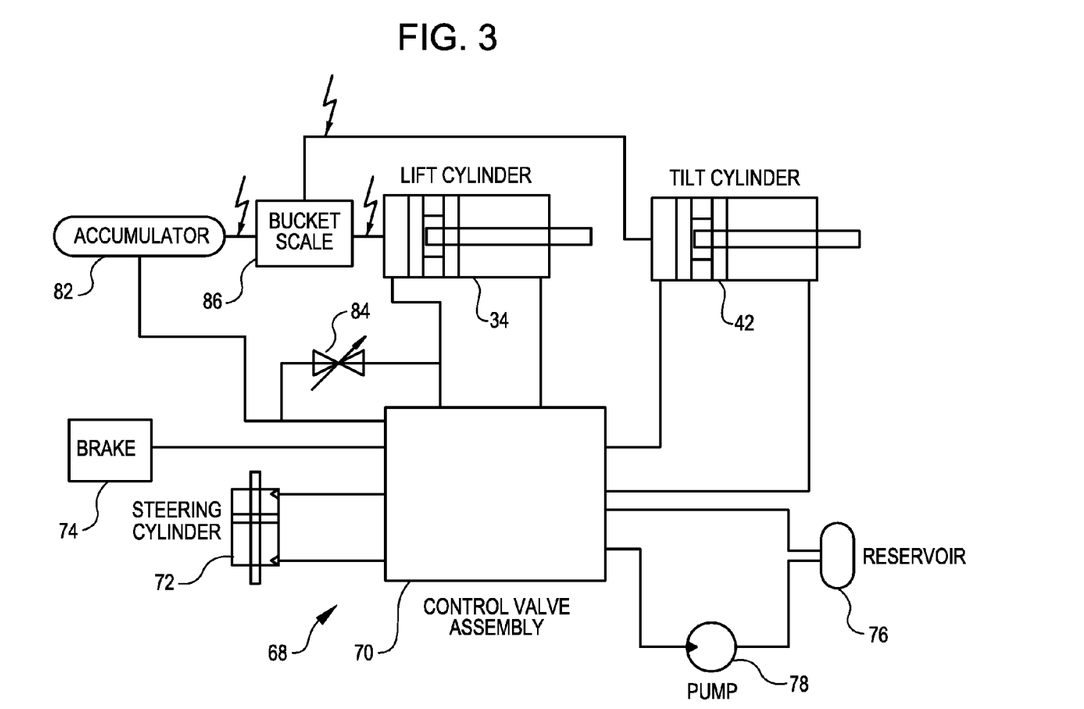
FIG. 3 is a diagram of a hydraulic system of the loader of FIG. 1.

FIG. 3 shows a diagram of a hydraulic system 68 for use with the loader 20. The hydraulic system 68 includes a control valve assembly 70, which includes a plurality of individual valves (not shown) for routing hydraulic fluid to the various components of the loader 20 such as the lift cylinder assembly 34, and the tilt cylinder assembly 42. For example, as is known, a valve (not shown) in the control valve assembly 70 can be opened to provide a pressure differential between the head-end 52 and rod-end 54 of the lift cylinder assembly 34 in order to move the rod 56 into or out of the casing 50, depending on the direction the valve is opened. The valves of the control valve assembly 70 can be mechanically, electrically, or otherwise connected to corresponding controls located inside the cab 30. For instance, a valve in the control valve assembly 70 corresponding to the lift cylinder assembly 34 can be controlled by a lever mechanically attached to the valve. Pushing the lever forward can cause the valve to allow a pressure differential between the head-end 52 and rod-end 54 such that the rod 56 retracts into the casing 50, thereby lowering the bucket 24. Pulling the lever back can cause the valve to allow the opposite pressure differential such that the rod 56 exits the casing 50, thereby raising the bucket 24.

As shown in the diagram, the hydraulic system 68 can include a hydraulic steering cylinder assembly 72 mechanically connected to the front wheels 28 so as to selectively orient the front wheels 28 in order to steer the loader 20. A hydraulic brake assembly 74 can be connected to the hydraulic system 68 so as to provide a mechanism for slowing or stopping rotational motion of the wheels 28 and, thereby, to provide for slowing or stopping the loader 20.

A reservoir 76 of hydraulic fluid for use in the hydraulic system 68 can be included in the hydraulic system 68 in order to ensure that the hydraulic system 68 has an adequate supply of hydraulic fluid. A pump 78 fluidly connected to the reservoir 76 operates to create and maintain a pressure differential into the hydraulic system 68 for operation of the various components of the hydraulic system 68. One or more energy storage devices can also be used in the hydraulic system 68 in order to maintain pressure in the hydraulic system 68 as well as to buffer against short bursts of pressure caused by the pump 78, or abrupt movement of any of the components of the hydraulic system 68. For example, in an embodiment, an accumulator 82 is fluidly connected to the brake assembly 74 so as to provide pressure to the brake assembly 74 in case of a loss of pressure elsewhere in the hydraulic system 68, a pump 78 failure, or in instances when the pump 78 is not able to create enough pressure in the hydraulic system 68, to operate several components of the hydraulic system 68 operating simultaneously. A valve 84 can be located between the head-end 52 of the lift cylinder assembly 34 so as to selectively provide a fluid connection between the head-end 52 of the lift cylinder assembly 34 and the accumulator 82, as described more fully below. In an embodiment, the valve 84 is closed during normal operation of the loader 20, that is, while the loader 20 is used to move material from one location to another. In an embodiment, the valve 84 is electrically controlled and operated, although it can be manually operated.

In accordance with an embodiment, the hydraulic system 68 includes a bucket scale 86 for determining the weight of the payload 44 in the bucket 24. As with a typical bucket scale known in the art, the bucket scale 86 receives data from a plurality of sensors on the loader 20 and, from that data, calculates the weight of the payload 44. In an embodiment, the bucket scale 86 receives data from sensors located on the lift cylinder assembly 34 and tilt cylinder assembly 42 so as to provide physical data of the lift cylinder assembly 34 and tilt cylinder assembly 42. For instance, in an embodiment, for both the lift cylinder assembly 34 and tilt cylinder assembly 42, the sensors provide data corresponding to pressures inside the head-end 52 and rod-end 54 as well as data corresponding to displacement of the rod 56 relative to the casing 50 and the velocity or speed of the rod 56 relative to the casing 50. In general, the bucket scale 86 can be any device capable of receiving physical data of the loader 20 and calculating payload 44 weight based on the data.

As shown in FIG. 3, the bucket scale 86 is electrically connected to sensors of the lift cylinder assembly 34, tilt cylinder assembly 42, and accumulator 82. In an embodiment, the sensors provide data to the bucket scale 86 from which the bucket scale 86 calculates head-end 52 and rod-end 54 pressures of the lift cylinder assembly 34, displacement of the rod 56 of the lift cylinder assembly 34, and the velocity of the rod 56. Sensors for providing physical data of the tilt cylinder assembly 42 can also be included for use in calculations performed by the bucket scale 86. In an alternate embodiment, the bucket scale 86 is wirelessly connected to one or more of the lift cylinder assembly 34, tilt cylinder assembly 42, and accumulator 82. In general, the bucket scale 86 can utilize any means of communication with appropriate sensors to determine payload 44 weight.

Figure 4:
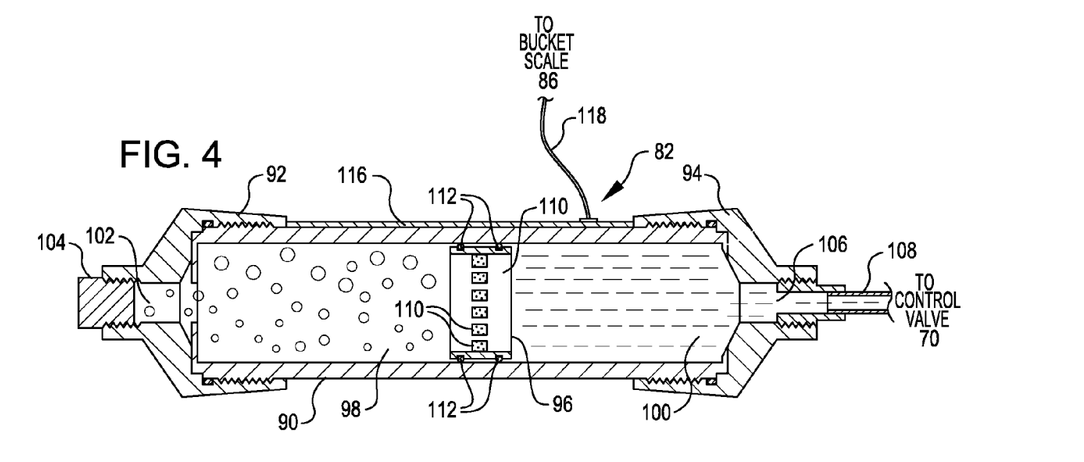
FIG. 4 is a side cut-away view of an accumulator of the loader of FIG. 1.

FIG. 4 shows details of an accumulator 82 used with the loader 20, in accordance with an embodiment, although other energy storage devices can be used. As shown in the drawing, the accumulator 82 includes a cylindrical accumulator casing 90 capped on opposite ends by a gas-end cap 92 and a fluid-end cap 94. Inside the accumulator casing 90 is a piston 96 slidably disposed so as to divide the interior of the accumulator 82 into a gas compartment 98 and a fluid compartment 100, the gas compartment 98 situated adjacent to and bordered by the gas-end cap 92 and the fluid compartment 100 situated adjacent to and bordered by the fluid-end cap 94. As their names imply, the gas compartment 98 is filled with a compressible gas, such as nitrogen, and the fluid compartment 100 is filled with a substantially incompressible fluid, such as hydraulic fluid of the hydraulic system 68 of the loader 20. In an embodiment, the gas compartment 98 is accessible via an air port 102 sealed by a plug 104, which can be removed to maintain the gas compartment 98, such as by refilling with a fresh supply of compressible gas. A fluid port 106 fluidly connects the accumulator 82 to the control valve assembly 70 via a hydraulic hose 108, pipe, or other conduit.

The piston 96, in accordance with an embodiment, comprises a cylindrically-shaped barrel assembly 110 oriented with a central axis parallel to the central axis of the accumulator casing 90. The piston 96 is configured to have an outer diameter approximately equal to the inner diameter of the accumulator casing 90. A pair of o-rings 112 sit inside parallel grooves extending around the barrel assembly 110 so as to provide a seal between the barrel assembly 110 and the interior surface of the accumulator casing 90. A series of magnets 114 extend around the outer curved surface of barrel assembly 110, in an embodiment, between the two o-rings 112, although the magnets 114 can be located on or in other locations of the barrel assembly 110.

In an embodiment, an elongate magnetic sensor 116 extends along a substantial portion of the length of the accumulator casing 90 parallel to the central axis of the accumulator casing 90. The magnetic sensor 116 is configured to sense the proximity of one or more of the magnets 114 so as to provide information corresponding to the location of the piston 96 relative to the accumulator casing 90. In an embodiment, the magnetic sensor 116 provides data corresponding to the position of the piston 96 to the bucket scale 86 via an electric wire 118, although other mechanisms for communicating data can be used. Because the piston 96 divides the interior of the accumulator 82 into the gas compartment 98 and the fluid compartment 100, the volume of the gas compartment 98 can be determined by using the magnetic sensor 116 to determine the location of the piston 96.

Further, because hydraulic fluid is substantially incompressible and nitrogen is compressible, as the pressure of the portion of the hydraulic system 68 fluidly connected to the accumulator 82 rises, the fluid compartment 100 fills with more hydraulic fluid, causing the piston 96 to move inside the accumulator casing 90 so as to compress the gas inside the gas compartment 98. In the embodiment shown in the drawing, the piston 96 moves to the left as the pressure inside the fluid compartment 100 increases. Likewise, as the pressure inside the portion of the hydraulic system 68 fluidly connected to the accumulator 82 decreases, the gas inside the gas compartment 98 expands, causing the piston 96 to move inside the accumulator casing 90. In the embodiment shown, the piston 96 moves to the right as the pressure inside the fluid compartment 100 decreases. Consequently, the compressed gas inside the gas compartment 98 provides a mechanism for storing energy for use in the hydraulic system 68, such as to provide hydraulic pressure in order to activate the brake assembly 74.

Figure 5:
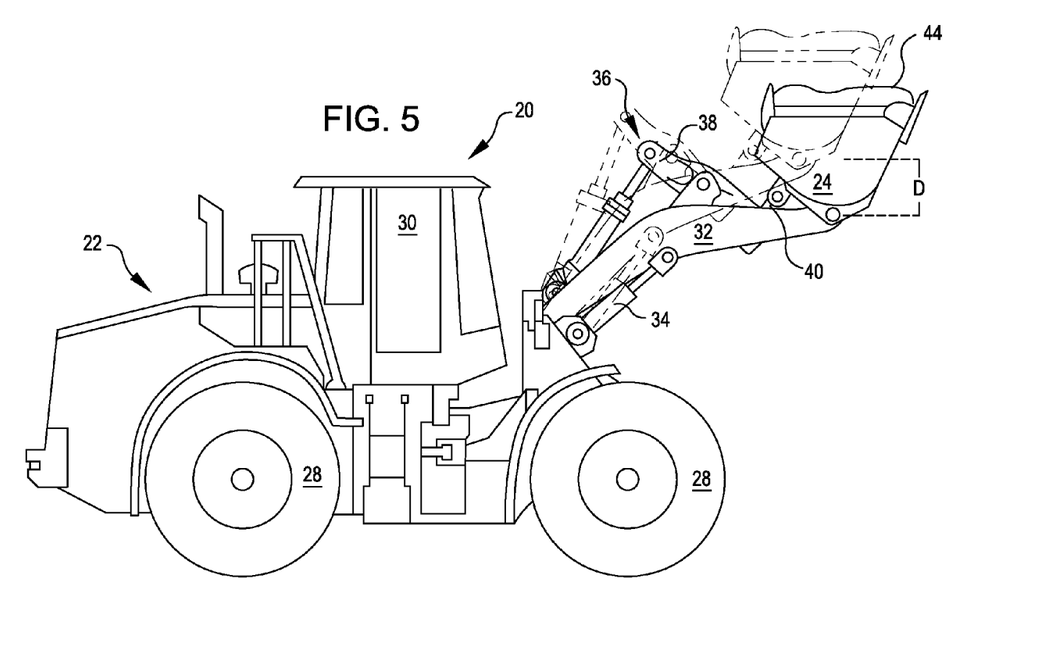
FIG. 5 is a side view of the loader of FIG. 1 with its bucket raised and a payload in the bucket.

FIG. 5 shows a flowchart demonstrating a method for calculating the weight of a payload 44, in accordance with an embodiment. At a bucket loading step 120, the payload 44 is loaded into the bucket 24. In an embodiment, an operator of the loader 20 operates the loader 20 so as to drive the loader 20 into a pile of material, gradually curling the bucket 24 so as to scoop a portion of the material into the bucket 24. Other ways of loading the payload 44 into the bucket 24, such as manually loading the payload 44 into the bucket 24 can be used.

With the bucket 24 loaded, the loader 20 is operated so as to move the bucket 24 into a predetermined position at a bucket initialization step 122. In an embodiment, as shown in phantom in FIG. 5, the bucket 24 opens upwardly from a position several feet above the ground when in the predetermined position. Other predetermined positions can also be used. In an embodiment, sensors in the lift cylinder assembly 34 and tilt cylinder assembly 42 measuring the displacement of the rod 56 of each cylinder assembly 34, 42 are utilized to ensure that the bucket 24 is in the predetermined position, although other methods, such as manual measurement, can be used.

At an energy storage device connection step 124, the head-end 52 of the lift cylinder assembly 34 is fluidly connected to an energy storage device. The energy storage device can be one that is primarily used for another purpose, such as the accumulator 82 used to store energy for the brake assembly 74, or the energy storage device can be one that is primarily dedicated for use in determining payload 44 weight, and can be an energy storage device that is temporarily connected to the loader 20 for the purpose of determining payload 44 weight. While the following discussion refers to the accumulator 82, it is understood that any suitable energy storage device can be used in place of the accumulator 82. In an embodiment, connecting the head-end 52 of the lift cylinder assembly 34 to the energy storage device includes connecting the head-end 52 of the lift cylinder assembly 34 to the accumulator 82 by opening the valve 84 shown in FIG. 3. If appropriate, other valves (not shown) can be closed so as to prevent other components of the loader 20 from transferring energy to the accumulator 82 or other storage device during use of the accumulator 82, or other storage device, to calculate payload 44 weight.

Referring to FIG. 4, when the accumulator 82 is connected to the head-end 52 of the lift cylinder assembly 34, gravity is allowed to push the bucket 24 downward, thereby causing fluid from the hydraulic system 68 to enter the fluid compartment 100. The fluid entering the fluid compartment 100 causes the pressure inside the fluid compartment 100 to rise and, consequently, pushes the piston 96 inside the accumulator casing 90 so as to compress the gas inside the gas compartment 98. As shown in FIG. 7, the bucket 24 drops a vertical distance D, which can be measured either manually or by using sensors to detect the change in displacement of the rod 56 of the lift cylinder assembly 34. Other measurements can be taken in addition or as an alternative, such as the drop in an estimation of the center of gravity of the combination of bucket 24, linkage, and payload 44, or as the drop in a point on the linkage, such as on one of the booms 32. In general, any geometrical change of the bucket 24, linkage, and/or payload can be measured.

Returning to FIG. 6, at a recording step 126, physical changes in the accumulator 82 and in the bucket 24 caused by connecting the head-end 52 of the lift cylinder assembly 34 to the accumulator 82 are recorded in order to determine the work done on the accumulator 82 by the dropping bucket 24. In an embodiment, recording physical changes in the accumulator 82 includes recording the change in volume of the gas in the gas compartment 98 by measuring the change in position of the piston 96 inside the accumulator casing 90 and by recording the change of pressure inside the gas compartment 98. The change in pressure inside the gas compartment 98 can be measured in several ways, such as by recording the pressure inside the head-end 52 of the lift cylinder assembly 34 when it is fluidly connected to the accumulator 82 after the bucket 24 has come to rest after dropping. In addition, one or more sensors (not shown) can be included with the accumulator 82 so as to record changes of pressure therein. Generally, any mechanism or combination of mechanisms for recording physical changes to the accumulator 82 can be used. Recording the changes of the bucket 24 includes recording the distance D, as described above. In an embodiment, the changes are recorded in the bucket scale 86, which includes a processor or other computing mechanism for transforming data about the bucket 24 and accumulator 82 into payload 44 weight, and appropriate memory for use therewith.

Figure 6:
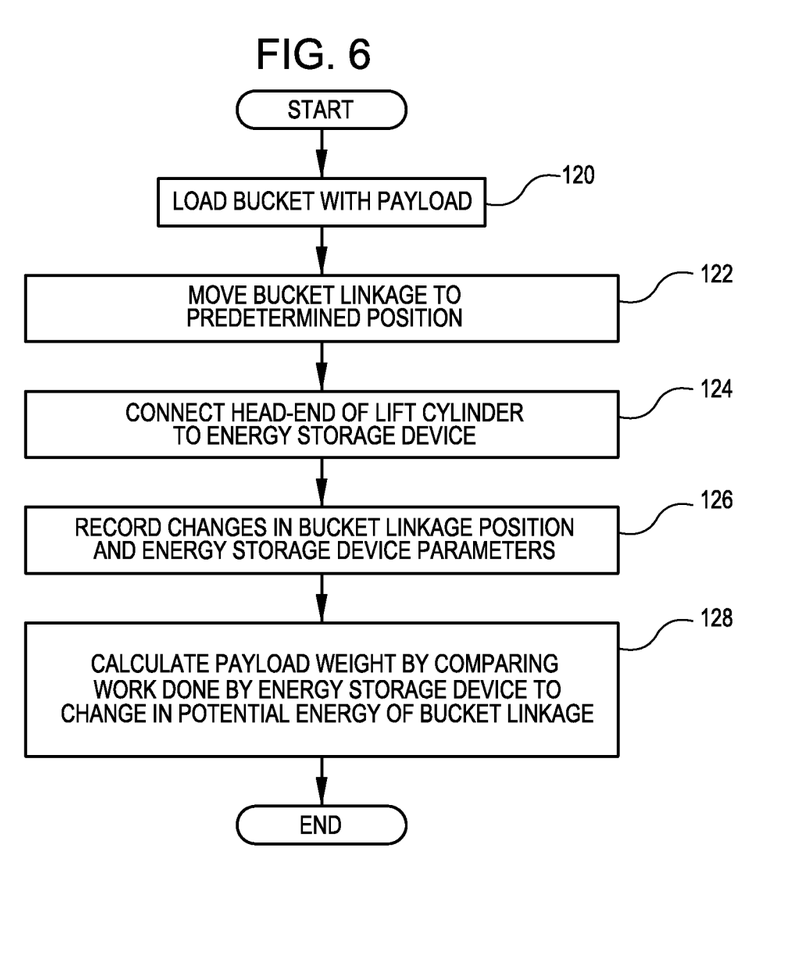
FIG. 6 is a schematic diagram of a method for determining the weight of a payload in the bucket of the loader of FIG. 1.

By recording the changes in the accumulator 82 and bucket 24, the work done on the accumulator 82 can be compared, at a calculation step 128, with the change in potential energy of the combination of items that change position after connecting the accumulator 82 to the head-end 52 of the lift cylinder assembly 34 in order to calculate the weight of the payload 44. The items that change position include the bucket 24, payload 44, booms 32, tilt cylinder assembly 42, and tilt linkage 36.

In an embodiment, information used in the calculations performed at the calculation step 128 is gathered before the payload 44 is loaded into the bucket 24. As an example, in an embodiment, the accumulator 82 is connected to the head-end 52 of the lift cylinder assembly 34 when the bucket 24 is empty, and in the predetermined position in order to provide reference values for the pressure and volume of the gas inside the gas compartment 98 when the weight of the booms 32, bucket 24, and other related components are alone causing compression of the gas in the gas compartment 98. The position of the empty bucket 24 when the head-end 52 of the lift cylinder assembly 34 is connected to the accumulator 82 is referred to as the empty equilibrium position, and the position of the bucket 24 with payload 44 when the head-end 52 of the lift cylinder assembly 34 is connected to the accumulator 82 is referred to as the full equilibrium position. As the weights of the various components of the loader 20 are generally known, this information can also be predetermined based on the known values.

At the calculation step 128, the weight of the payload 44 is determined from the comparison of the work done on the accumulator 82, which can be measured using the ideal gas law or other model of the gas inside the accumulator 82, with the change in potential energy described above. Because the weights of the components of the loader 20 that undergo a change in potential energy when the accumulator 82 is connected to the head-end 52 of the lift cylinder assembly 34 and their geometry in reference to the loader 20 are known, the weight of the payload 44 can be determined using the work done on the accumulator 82 and the change in position of the bucket 24. Because the change in potential energy of the various components of the loader 20 that change position when the accumulator 82 is connected to the head-end 52 of the lift cylinder assembly 34 is approximately equal to the work done on the accumulator 82, and because the change of geometry of the components of the loader 20 are measured, there is sufficient information is available to determine the weight of the payload 44. Thus, the bucket scale 86, in accordance with an embodiment, calculates the work done on the accumulator 82, and uses that information to solve an equation whose single unknown variable is the weight of the payload 44.

As an example, the bucket scale 86 uses the work done on the accumulator 82 and the distance D and calculates the weight of the payload 44 according to an approximation of the loader 20 that assumes the bucket 24 and payload 44 drop straight downward when the accumulator 82 is connected to the head-end 52 of the lift cylinder assembly 34. Thus, the bucket scale 86 calculates the weight of the payload 44 as the value of $\Delta W/gD$, where $\Delta W$ is the work done on the accumulator 82 as the bucket 24 moves from the empty equilibrium position to the full equilibrium position, g is the gravitational constant given in appropriate units (such as 9.8 m/s2), and D is as above. The value of $\Delta W$ can be determined using the ideal gas law while monitoring the volume inside the gas compartment 98, and pressure and temperature therein. In addition, manufacturers of energy storage devices often include tables from which the work done by the energy storage device can be ascertained by referencing changes in volume and pressure. Such tables can be programmed into the bucket scale 86 or can be manually referenced when appropriate. Other formulas that take into account the geometry of the linkage connecting the bucket 24 to the loader 20 can be used as well, as can formulas that take into account the weights of various components of the loader 20 and their weight distributions.

While the arrangement is illustrated in connection with a loader 20, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earthmoving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

When it is necessary to calibrate the bucket scale 86 of a loader 20, the weight of a payload 44 used for calibration should be known. In accordance with an embodiment, the weight of the payload 44 is determined using an energy storage device.

The loader 20 is driven to a suitable location, such as a location where the loader 20 is on a section of ground that approximates a level plane. The loader 20 is operated to bring the bucket 24 into a predetermined position, such as the position shown in phantom in FIG. 5. The valve 84 is opened to fluidly connect the head-end 52 of the lift cylinder assembly 34 with the accumulator 82 so as to allow gravity to push the bucket 24 downward, thereby forcing fluid into the fluid compartment 100 of the accumulator 82, causing the piston 96 to compress gas in the gas compartment 98.

The volume and pressure of the gas in the gas compartment 98 are measured to provide reference data of the work done on the accumulator 82 as the empty bucket 24 and other loader 20 components drop, thereby compressing the gas in the gas compartment 98 of the accumulator 82. The reference data can also be predetermined and provided from a manufacturer of the loader 20. The valve 84 is closed, thereby fluidly isolating the accumulator 82 from the head-end 52 of the lift cylinder assembly 34, and the bucket 24 is loaded with the payload 44. The loader 20 is operated so as to bring the loaded bucket 24 into the predetermined position. If necessary, before connecting the head-end 52 of the lift cylinder assembly 34 to the accumulator 82, open valves (not shown) connecting the accumulator 82 to other components of the loader 20 can be closed so as not to act on the accumulator 82 during payload 44 estimation. In addition, the pump 78 is shut off or isolated from the head-end 52 of the lift cylinder assembly 34 in order to prevent the pump 78 from compensating for a loss of pressure in the head-end 52 of the lift cylinder assembly 34 when the head-end 52 is connected to the accumulator 82.

The valve 84 is opened, thereby fluidly connecting the head-end 52 of the lift cylinder assembly 34 to the accumulator 82 and the bucket 24 is allowed to drop, pushing fluid into the fluid compartment 100 of the accumulator 82, thereby moving the piston 96 and compressing the gas in the gas compartment 98.

The magnetic sensor 116 sends data to the bucket scale 86 corresponding to the position of the piston 96 inside the accumulator casing 90 of the accumulator 82 and the bucket scale 86 calculates from the data the volume of the gas compartment 98. Data corresponding to the pressure inside the head-end 52 of the lift cylinder assembly 34, which equalizes with the pressure inside the gas compartment 98, is provided to the bucket scale 86. The bucket scale 86 receives the pressure data and uses the pressure data, the volume data, and the reference data to determine the weight of the payload 44. In an alternate embodiment, temperature data from a temperature sensor in the gas compartment 98 is also considered in calculating the weight of the payload 44.

After the payload 44 weight is calculated, the valve 84 is isolated from the head-end 52 of the lift cylinder assembly 34, for example, by closing the valve 84. The bucket scale 86 uses the payload 44 weight to calibrate the bucket scale 86 so that the bucket scale 86 can, for example, calculate the weight of other payloads using pressure and displacement measurements from the head-end 52 and rod-end 54 of the lift cylinder and tilt cylinder assemblies 34, 42.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. A method of estimating the weight of a payload in a bucket of a machine, the bucket attached by a linkage to a chassis of the machine, the method comprising:
    orienting the bucket and linkage to a first suspended position;
    storing potential energy of the bucket, payload, and linkage in an energy storage device by releasing the bucket and linkage from the first suspended position to a second suspended position;
    measuring an effect on the energy storage device caused by storage of potential energy of the bucket, payload, and linkage;
    measuring a change in a geometrical property of the bucket and linkage between an initial position and the second suspended position; and
    calculating the weight of the payload using the effect on the energy storage device and the change in the geometrical property of the bucket and linkage.

2. The method of claim 1, wherein the energy storage device is a component of the machine used for storing energy for use by the machine.

3. The method of claim 1, wherein the machine includes a brake and a steering mechanism and wherein the energy storage device is selected from the group consisting of an accumulator for storing energy to operate the brake and an accumulator for storing energy to operate the steering mechanism.

4. The method of claim 1, wherein the machine comprises a hydraulic lift cylinder assembly configured to lift the bucket, the lift cylinder assembly having a head-end, and wherein storing potential energy of the bucket and linkage includes fluidly connecting the energy storage device to the head-end.

5. The method of claim 1, wherein the change in the geometrical property is a vertical distance traversed by a point of the bucket as the bucket moves from the first suspended position to the second suspended position.

6. The method of claim 1, wherein the bucket, linkage and payload have a center of gravity and wherein the method further includes estimating the center of gravity of the bucket, linkage and payload, and wherein the change in the geometrical property is the vertical distance traversed by the center of gravity as the bucket moves from the first suspended position to the second suspended position.

7. The method of claim 1, wherein the initial position is the first suspended position.

8. The method of claim 1, further including:
    orienting the bucket and linkage without the payload to the first suspended position; and
    storing potential energy of the bucket and linkage without the payload in the energy storage device by releasing the bucket and linkage from the first suspended position to the initial position.

9. An apparatus for determining the weight of a payload in a bucket of a machine, the bucket attached to a chassis of the machine by a linkage, the apparatus comprising:
    an energy storage device for storing potential energy of the bucket, payload, and linkage, thereby causing the bucket to move from a first suspended position to a second suspended position;
    a mechanism for providing physical data corresponding to a physical change in the energy storage device caused by storage of the potential energy; and
    a processor configured to calculate the weight of the payload using the physical data.

10. The apparatus of claim 9, wherein the energy storage device is configured to store energy to provide power for operation of the machine.

11. The apparatus of claim 10, wherein the machine includes a brake and a steering mechanism and wherein the energy storage device is selected from the group consisting of an accumulator for storing energy to operate the brake and an accumulator for storing energy to operate the steering mechanism.

12. The apparatus of claim 9, wherein the machine includes a hydraulic lift cylinder assembly configured to lift the bucket, the lift cylinder assembly having a head end, and wherein the energy storage device is configured to fluidly attach to the head end.

13. The apparatus of claim 9, further including a mechanism for providing geometrical data corresponding to a geometrical change in the bucket and linkage caused by storage of the potential energy and wherein the processor is further configured to use the geometrical data in calculating the weight of the payload.

14. The apparatus of claim 13, wherein the geometrical data include data corresponding to a vertical distance traversed by a point of the bucket as the bucket moves from the first suspended position to the second suspended position.

15. The apparatus of claim 13, wherein the bucket, linkage and payload have a center of gravity and wherein the geometrical data include data corresponding to a vertical distance traversed by the center of gravity of the bucket, linkage and payload as the bucket moves from the first suspended position to the second suspended position.

16. The apparatus of claim 9, wherein the machine further comprises sensors for providing linkage data corresponding to physical properties of the linkage and wherein the processor is further configured to receive the linkage data and calculate the weight of the payload from the physical data.

17. The apparatus of claim 9, wherein the energy storage device has a compartment filled with compressible matter and is configured to store the potential energy by reducing the volume of the compartment and wherein the physical data include data corresponding to volume and pressure of the compartment.

18. An apparatus for calculating the weight of a payload used to calibrate a bucket scale of a machine having a bucket for carrying the payload, the bucket connected to a chassis of the machine by a linkage, the linkage raised by a hydraulic lift cylinder assembly having a head-end, the apparatus comprising:

an energy storage device configured to be fluidly connected to the head-end of the lift cylinder assembly in order to store potential energy of the linkage as the linkage moves from a first position to a second position;

a sensor for providing physical data indicating work done on the energy storage device by storing potential energy of the linkage; and a processor for receiving the physical data and for receiving geometrical data corresponding to geometrical changes in the bucket and linkage caused by storage of the potential energy by the energy storage device and for calculating the weight of the payload from the physical data and geometrical data.

19. The apparatus of claim 18, wherein the machine includes a brake and a steering mechanism and wherein the energy storage device is selected from the group consisting of an accumulator for storing energy to operate the brake and an accumulator for storing energy to operate the steering mechanism.

20. The apparatus of claim 19, further including a second sensor for providing the geometrical data to the processor.

* * * * *